US012743469B2

(12) United States Patent
Wang et al.

(10) Patent No.: US 12,743,469 B2
(45) Date of Patent: Sep. 22, 2026

(54) GENERATING SPATIAL-TEMPORAL REPRESENTATIONS OF DIGITAL FILES USING ARTIFICIAL INTELLIGENCE TECHNIQUES

(71) Applicant: Dell Products L.P., Round Rock, TX (US)

(72) Inventors: Zijia Wang, London (GB); Srinath Kappgal, Cork (IE); Jing Yu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/036,555

(22) Filed: Jan. 24, 2025

(65) Prior Publication Data

US 2026/0220198 A1 Jul. 30, 2026

(51) Int. Cl.

*G06F 16/00* (2019.01)
*G06F 16/22* (2019.01)
*G06F 16/901* (2019.01)
*G06N 3/0455* (2023.01)

(52) U.S. Cl.

CPC ...... *G06F 16/9024* (2019.01); *G06F 16/2246* (2019.01); *G06N 3/0455* (2023.01)

(58) Field of Classification Search

None

See application file for complete search history.

(56) References Cited

U.S. PATENT DOCUMENTS

| | | | | |
|---|---|---|---|---|
| 8,942,515 | B1 | 1/2015 | Huang | |
| 2021/0185066 | A1 | 6/2021 | Shah | |
| 2022/0188356 | A1 * | 6/2022 | Jorgensen | G06N 5/022 |

(Continued)

OTHER PUBLICATIONS

Title: "kD-STR: A Method for Spatio-Temporal Data Reduction and Modelling", Author: "Liam Steadman, Nathan Griffiths, Stephen Jarvis, Mark Bell, Shaun Helman, and Caroline Wallbank."; Date: May 2021; Publisher: ACM; Pertinent Pages: whole document (31 pages) (Year: 2021).*

(Continued)

*Primary Examiner* — Anhtai V Tran

(74) *Attorney, Agent, or Firm* — Ryan, Mason & Lewis, LLP

(57) ABSTRACT

Methods, apparatus, and processor-readable storage media for generating spatial-temporal representations of digital files using artificial intelligence techniques are provided herein. An example computer-implemented method includes determining one or more spatial properties within at least a portion of at least one digital file and at least one sequential order of data within the at least a portion of the digital file(s); generating at least one graph representation of the at least a portion of the digital file(s) based on the one or more spatial properties and the sequential order(s) of data; encoding parts of the graph representation(s) using at least one graph neural network in conjunction with one or more spatial-temporal transformers; generating a spatial-temporal feature representation of the digital file(s) by aggregating a plurality of the encoded parts of the graph representation(s); and performing one or more automated actions based on the spatial-temporal feature representation of the digital file(s).

20 Claims, 6 Drawing Sheets

(56) References Cited

U.S. PATENT DOCUMENTS

| | | | | |
|---|---|---|---|---|
| 2023/0046851 | A1 | 2/2023 | Ogura | |
| 2023/0367961 | A1 | 11/2023 | Jha | |
| 2025/0036607 | A1 | 1/2025 | Plumley | |
| 2025/0103884 | A1* | 3/2025 | Fan | G06N 3/0455 |
| 2025/0328523 | A1 | 10/2025 | Zhang | |

OTHER PUBLICATIONS

Liu et al. (2023). Arbitrary Point Cloud Upsampling Via Dual Back-Projection Network. In 2023 IEEE International Conference on Image Processing (ICIP) (pp. 1470-1474).
Wang et al. (2022). Object Centric Point Sets Feature Learning with Matrix Decomposition. In Proceedings of the Asian Conference on Computer Vision (pp. 251-264).
Yang et al. (2022). A low-rank tensor bayesian filter framework for multi-modal analysis. In 2022 IEEE International Conference on Image Processing (ICIP) (pp. 3738-3742).
Liu et al. (2023). Soft-IntroVAE for Continuous Latent Space Image Super-Resolution. In 2023 IEEE International Conference on Image Processing (ICIP) (pp. 1460-1464).
Wang et al. (2023). The Oil and Water Separation Phenomenon Inspired Loss for Feature Learning. In 2023 IEEE International Conference on Image Processing (ICIP) (pp. 1510-1514).
Wang et al. (2022). Gift from nature: Potential Energy Minimization for explainable dataset distillation. In Proceedings of the Asian Conference on Computer Vision (pp. 235-250).
Wang et al. (2022). Uncertainty-aware self-training with expectation maximization basis transformation. In Advances in Neural Information Processing Systems 36.
Wang et al. (2022). Potential Energy based Mixture Model for Noisy Label Learning. In Advances in Neural Information Processing Systems 36 (pp. 33795-33805).
Wang et al. (2024). StyleMamba: State Space Model for Efficient Text-driven Image Style Transfer. arXiv preprint arXiv:2405.05027.
Zhou et al. "TransVOD: End-to-End Video Object Detection with Spatial-Temporal Transformers". In: IEEE Transactions on Pattern Analysis and Machine Intelligence (2022).
Paul et al., A Resource-Aware Nearest-Neighbor Search Algorithm for K-Dimensional Trees, Conference on Design and Architectures for Signal and Image Processing, 2013.
U.S. Appl. No. 18/919,996, filed Oct. 18, 2024, entitled "Digital File Similarity Detection Using Artificial Intelligence Techniques."
Bentley, J. "Multidimensional binary search trees used for associative searching". In: Communications of the ACM. vol. 18. 9. ACM. 1975, p. 509517.
Veličkovi'c et al. "Graph attention networks". In: International Conference on Learning Representations. 2018.
Xu et al. "How powerful are graph neural networks?" In: International Conference on Learning Representations. 2019.
Yu et al., "Spatio-temporal graph convolutional networks: A deep learning framework for traffic forecasting". In: arXiv preprint arXiv:1709.04875 (2017).
Kipf et al., "Semi-supervised classification with graph convolutional networks". In: arXiv preprint arXiv:1609.02907 (2016).
Li et al. "Gated graph sequence neural networks". In: arXiv preprint arXiv:1511.05493 (2015).
Goyal et al., "Dyngem: Deep embedding method for dynamic graphs". In: Proceedings of the 2018 SIAM International Conference on Data Mining. SIAM. 2018, pp. 189-197.
Vaswani et al. "Attention is all you need". In: Advances in Neural Information Processing Systems. 2017, pp. 5998-6008.
Devlin et al. "Bert: Pre-training of deep bidirectional transformers for language understanding". In: arXiv preprint arXiv:1810.04805 (2018).
Radford et al. "Improving language understanding by generative pretraining". amazonaws. com/openai-assets/research-covers/language-unsupervised/language understanding paper. pdf (2018).
Dosovitskiy et al. "An image is worth 16×16 words: Transformers for image recognition at scale". In: arXiv preprint arXiv:2010.11929 (2020).
Carion et al. "End-to-end object detection with transformers". In: European Conference on Computer Vision. Springer. 2020, pp. 213-229.
Touvron et al., "Training data-efficient image transformers & distillation through attention". In: arXiv preprint arXiv:2012.12877 (2020).
Steadman et al. ("kD-STR: A Method for Spatio-Temporal Data Reduction and Modeling", published May 2021) (Year: 2021).
Sadowski et al. (SimHash: Hash-based Similarly Detection) (Year: 2007).

* cited by examiner

GENERATING SPATIAL-TEMPORAL REPRESENTATIONS OF DIGITAL FILES USING ARTIFICIAL INTELLIGENCE TECHNIQUES

BACKGROUND

The expansion of digital content has led to increased needs for solutions in file similarity detection with respect to numerous applications such as, for example, data deduplication, plagiarism detection, malware analysis, digital forensics, etc. However, conventional file analysis approaches often rely on simplistic matching techniques which fail to capture many types of relationships within and across digital files. Accordingly, such conventional file analysis approaches lead to inadequate and/or imprecise outcomes, resulting in additional issues with respect to scaling and latencies.

SUMMARY

Illustrative embodiments of the disclosure provide techniques for generating spatial-temporal representations of digital files using artificial intelligence techniques.

An exemplary computer-implemented method includes determining one or more spatial properties within at least a portion of at least one digital file and at least one sequential order of data within the at least a portion of the at least one digital file. The method also includes generating at least one graph representation of the at least a portion of the at least one digital file based at least in part on the one or more spatial properties and the at least one sequential order of data, and encoding parts of the at least one graph representation using at least one graph neural network in conjunction with one or more spatial-temporal transformers. Further, the method additionally includes generating a spatial-temporal feature representation of the at least one digital file by aggregating a plurality of the encoded parts of the at least one graph representation, and performing one or more automated actions based at least in part on the spatial-temporal feature representation of the at least one digital file.

Illustrative embodiments can provide significant advantages relative to conventional file analysis approaches. For example, problems associated with scaling and latencies arising from inadequate and/or imprecise outcomes are overcome in one or more embodiments through generating spatial-temporal feature representations of digital files using spatial-sequential graph encoding techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
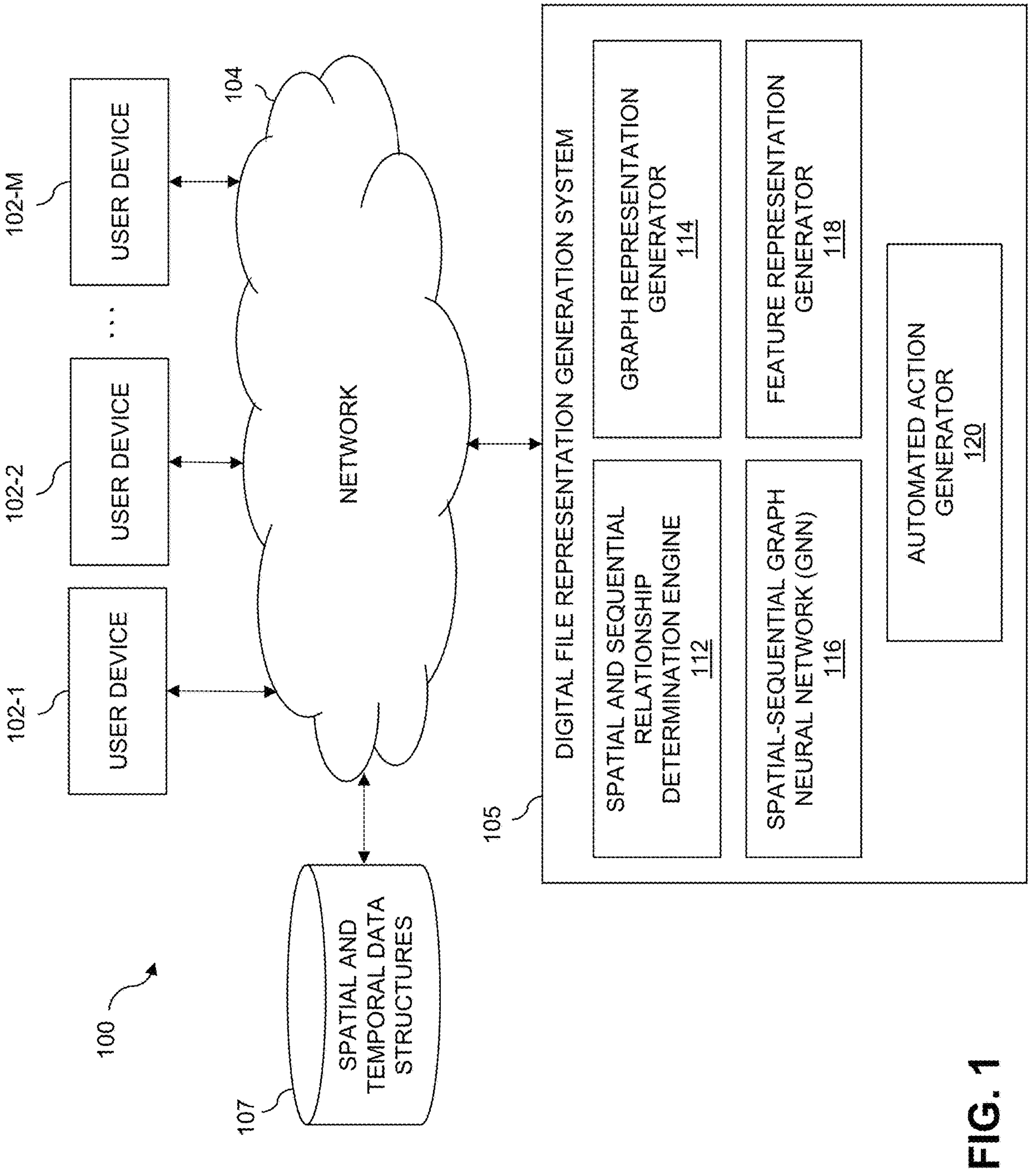
FIG. 1 shows an information processing system configured for generating spatial-temporal representations of digital files using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is digital file representation generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the digital file representation generation system 105 can have one or more spatial and temporal data structures 107 configured to store data having spatial attributes such as, e.g., coordinates, distances, regions, etc., as well as data that change over time such as, e.g., time series, streams, videos, etc. By way merely of example, spatial and temporal data structures 107 can include one or more SAKD trees, a type of data structure that extends KD-trees with sequential awareness.

The term "data structure," as used herein, is intended to be broadly construed, so as to encompass, for example, a wide variety of different types of tables, arrays, graphs, trees, linked lists, and additional or alternative data relation mechanisms, as well as portions or combinations thereof. Accordingly, a given data structure can comprise a combination of multiple smaller data structures, possibly of different types, or a portion of a larger data structure. Numerous other arrangements are possible.

The spatial and temporal data structures 107 in the present embodiment are implemented using one or more storage systems associated with the digital file representation generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the digital file representation generation system 105 are one or more input-output devices, which illustratively comprise keyboards, displays or other types of input-output devices in any combination. Such input-output devices can be used, for example, to support one or more user interfaces to the digital file representation generation system 105, as well as to support communication between the digital file representation generation system 105 and other related systems and devices not explicitly shown.

Additionally, the digital file representation generation system 105 in the FIG. 1 embodiment is assumed to be implemented using at least one processing device. Each such processing device generally comprises at least one processor and an associated memory, and implements one or more functional modules for controlling certain features of the digital file representation generation system 105.

More particularly, the digital file representation generation system 105 in this embodiment can comprise a processor coupled to a memory and a network interface.

The processor may comprise, for example, a microprocessor, an application-specific integrated circuit (ASIC), a system-on-chip (SOC), a field-programmable gate array (FPGA), a central processing unit (CPU), a graphics processing unit (GPU), a neural processing unit (NPU), a data processing unit (DPU), a tensor processing unit (TPU), an arithmetic logic unit (ALU), a digital signal processor (DSP), and/or other similar processing device components, as well as other types and arrangements of processing circuitry, in any combination. At least a portion of the functionality of at least one artificial intelligence system and its associated artificial intelligence algorithms provided by one or more processing devices as disclosed herein can be implemented using such circuitry.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the digital file representation generation system 105 to communicate over the network 104 with the user devices 102, and illustratively comprises one or more conventional transceivers.

The digital file representation generation system 105 further comprises spatial and sequential relationship determination engine 112, graph representation generator 114, spatial-sequential graph neural network (GNN) 116, feature representation generator 118, and automated action generator 120, as further detailed herein.

It is to be appreciated that this particular arrangement of elements 112, 114, 116, 118 and 120 illustrated in the digital file representation generation system 105 of the FIG. 1 embodiment is presented by way of example only, and alternative arrangements can be used in other embodiments. For example, the functionality associated with elements 112, 114, 116, 118 and 120 in other embodiments can be combined into a single module, or separated across a larger number of modules. As another example, multiple distinct processors can be used to implement different ones of elements 112, 114, 116, 118 and 120 or portions thereof.

At least portions of elements 112, 114, 116, 118 and 120 may be implemented at least in part in the form of software that is stored in memory and executed by a processor.

It is to be understood that the particular set of elements shown in FIG. 1 for digital file similarity analysis using spatial-sequential graph encoding techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of digital file representation generation system 105, spatial and temporal data structures 107, and user devices 102 can be on and/or part of the same processing platform.

An exemplary process utilizing elements 112, 114, 116, 118 and 120 of digital file representation generation system 105 in computer network 100 will be described in more detail with reference to the flow diagram of FIG. 4.

Accordingly, at least one embodiment includes digital file similarity analysis using spatial-sequential graph encoding techniques. To address limitations of conventional approaches, such an embodiment includes encoding and performing similarity analysis of digital files based at least in part on using at least one spatial-sequential algorithm in connection with SAKD trees. Accordingly, at least one embodiment includes combining advantages of hash-based methods and content-based methods, while introducing and/or implementing concepts of spatial and temporal transformers. Such an embodiment can include efficiently and accurately detecting digital files that are similar to one or more other digital files, not only with respect to content but also with respect to structure and/or order. As such, and as further detailed herein, one or more embodiments include integrating spatial data structures with sequential and graph-based learning algorithms, enhanced by one or more spatial-temporal transformer techniques, to create unique, multidimensional representations of digital files.

As further detailed herein (e.g., in connection with FIG. 2 as described below), at least one embodiment includes encoding and similarity matching of digital files through the development and implementation of at least one spatial-sequential algorithm to SAKD trees, incorporating portions of one or more spatial and temporal transformers.

Figure 2:
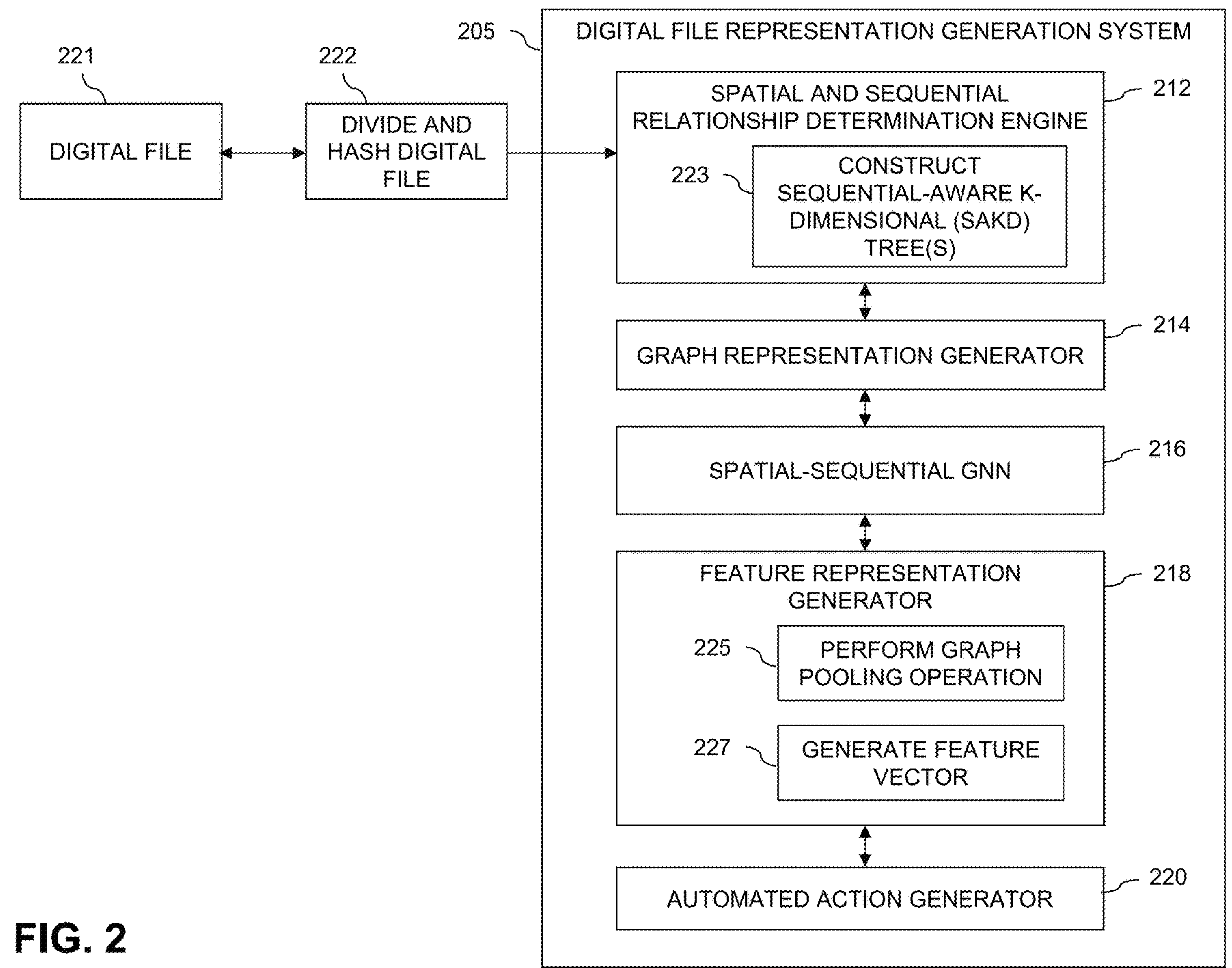
FIG. 2 shows an example system architecture and workflow in an illustrative embodiment.

FIG. 2 shows an example system architecture and workflow in an illustrative embodiment. By way of illustration, FIG. 2 depicts the integration of one or more spatial data structures with sequential and graph-based learning algorithms, enhanced by spatial-temporal transformer techniques, to create a multidimensional representation of files. More particularly, FIG. 2 depicts, in step 222, dividing digital file 221 into chunks (also referred to herein as portions) and hashing at least a portion of these chunks. In connection with such division and hashing actions, sequential positions associated with the hashed chunks are determined and provided to spatial and sequential relationship determination engine 212 of digital file representation generation system 205.

Subsequently, in step 223, spatial and sequential relationship determination engine 212 constructs one or more SAKD trees that capture both the spatial relationships of the hashed file chunks and their original sequence within digital file 221. The SAKD trees are then transformed into one or more graph representations by graph representation generator 214, wherein nodes represent file chunks augmented with one or more features derived from hash values and their sequential positions, and edges encode the spatial and temporal relationships between chunks.

Additionally, as depicted in FIG. 2, spatial-sequential GNN 216, which can include, e.g., at least one spatial-sequential algorithm which employs an adapted GNN architecture, integrates spatial and temporal dynamics through one or more mechanisms to process the graph and update one or more node representations, effectively capturing one or more spatial properties and the sequential order of the data. Also, feature representation generator 218 performs, in step 225, at least one graph pooling operation which aggregates one or more features of at least a portion of the nodes (e.g., all nodes), and uses such aggregated features to generate a single feature vector in step 227, the vector serving as a comprehensive feature representation of digital file 221.

This feature vector can be used as part of one or more automated actions, performed by automated action generator 220. Such automated actions can include retraining at least a portion of the GNN, outputting the feature vector to one or more devices and/or systems for further processing, initiating file similarity detection, etc.

Accordingly, one or more embodiments include using SAKD trees for a multidimensional representation of files that captures spatial and sequential relationships. Also, such an embodiment includes integrating and/or adapting spatial and temporal transformers within a GNN framework to encode these relationships and learn intra-graph and inter-graph dependencies. Additionally, such an embodiment includes implementing graph pooling techniques to synthesize such complex interactions into a singular, actionable feature vector for each digital file, enhancing and utilizing fuzzy similarity matching.

As further detailed herein, spatial data structures are designed to store and query data having spatial attributes such as, e.g., coordinates, distances, regions, etc. Examples of spatial data structures include quadtrees, octrees, R-trees, and KD-trees. KD-trees, as used herein, refer to binary trees that partition a data space into hyperrectangles along the axes. However, KD-trees may not be suitable for storing and querying data that have temporal attributes, such as time-stamps, durations, sequences, etc. Temporal data structures are designed to handle data that change over time, such as time series, streams, or videos. Examples of temporal data structures can include, e.g., B-trees, R*-trees, interval trees, etc. Temporal data structures can support operations such as, e.g., temporal join, aggregation, indexing, etc.

Based at least in part on a need and/or preference to capture both spatial and temporal information of digital files and/or content, one or more embodiments include generating and/or implementing SAKD trees, a unique type of data structure that extends KD-trees with sequential awareness. In such an embodiment, SAKD trees divide files into chunks, hash these chunks, and record the sequential positions of at least portions of the chunks. Accordingly, SAKD trees capture both the spatial relationships of file chunks and the original sequence of file chunks within the given file. Additionally, SAKD trees can support efficient and accurate file similarity detection based at least in part on file content and file structure.

As also detailed herein, GNNs are a class of deep learning models that operate on graph-structured data, such as, e.g., social networks, knowledge graphs, molecular graphs, etc. GNNs can learn node and edge representations by aggregating information from local neighborhoods, and can perform various tasks such as, e.g., node classification, link prediction, and graph generation. Examples of GNNs can include graph convolutional networks (GCNs), graph attention networks (GATs), and graph isomorphism networks (GINs).

However, many GNNs are designed for static graphs and cannot handle graphs that change over time, such as, e.g., dynamic networks, temporal graphs, spatio-temporal graphs, etc. Dynamic graph neural networks (DGNNs) can include deep learning models that capture temporal evolution of graph-structured data and perform tasks such as dynamic node classification, link prediction, graph generation, etc. Examples of DGNNs can include recurrent graph neural networks (R-GNNs), temporal graph convolutional networks (T-GCNs), and dynamic graph attention networks (DyGATs).

While conventional GNN models cannot capture both the spatial and temporal information of digital files, at least one embodiment includes generating and/or implementing at least one spatial-sequential algorithm, a unique GNN model that operates on graph representations of files derived from SAKD trees. Such a spatial-sequential algorithm employs an adapted GNN architecture, integrating spatial and temporal dynamics through one or more mechanisms. Also, such a spatial-sequential algorithm can process a graph and update node representations, effectively capturing both the spatial properties and the sequential order of data. Further, such a spatial-sequential algorithm can generate a comprehensive feature vector for each file, facilitating a nuanced approach to fuzzy similarity matching.

As also detailed herein, transformers refer to a class of deep learning models that use one or more self-attention mechanisms to encode and decode sequential data (such as, e.g., natural language data, speech data, music data, etc.). Transformers can capture long-range dependencies and patterns in sequential data, and can perform tasks such as machine translation, text summarization, and natural language generation. Examples of transformers can include, for instance, bidirectional encoder representations from transformers (BERT), and generative pre-trained transformers (GPTs).

However, many transformers are designed for one-dimensional sequential data, and cannot handle data with spatial dimensions, such as images, videos, point clouds, etc. Accordingly, spatial transformers refer to a class of deep learning models that use one or more self-attention mechanisms to encode and decode spatial data, and can perform tasks such as image classification, object detection, image generation, etc. Examples of spatial transformers can include, for instance, vision transformers (ViTs), detection transformers (DETRs), and data-efficient image transformers (DeiTs).

While conventional transformer models cannot capture the spatial and temporal information of digital files, one or more embodiments include generating and/or implementing at least one spatial-temporal transformer, a unique type of transformer model that enhances at least one spatial-sequential algorithm (such as detailed above) with one or more spatial-temporal transformer techniques. Such a spatial-temporal transformer can learn spatial and temporal features from the graph representations of files, and can perform self-attention and cross-attention across different file chunks and/or different files. Also, such a spatial-temporal transformer can improve the quality and robustness of the feature vectors generated by the at least one spatial-sequential algorithm, and can enable more accurate and efficient file similarity detection based at least in part on providing a multidimensional representation of files.

As further detailed herein, one or more embodiments include file division and hashing, SAKD tree construction, graph representation and feature engineering, spatial-sequential GNN encoding, spatial-temporal transformer integration, graph pooling and feature vector generation, and fuzzy similarity matching.

More particularly, such an embodiment includes dividing files into chunks and hashing at least a portion of the chunks, followed by the construction of one or more SAKD trees to capture spatial and sequential relationships across at least a portion of the hashed chunks. At least a portion of the SAKD trees is then transformed into one or more graph representations, which are processed by at least one spatial-sequential GNN and enhanced using one or more spatial-temporal transformer techniques. Further, at least one graph pooling operation is implemented to aggregate node features into one or more comprehensive feature vectors, facilitating nuanced fuzzy similarity matching.

At least one embodiment can include utilizing naïve file division and hashing techniques. Given a digital file F, such an embodiment includes dividing digital file F into N chunks, wherein each chunk $C_i$ represents a segment of the digital file F. This division is based at least in part on a predetermined chunk size, s, to ensure uniformity in processing. Each chunk is then hashed using a cryptographic hash function, H, to generate a unique identifier, $h_i$, for each chunk, such as illustrated via Equation (1) as follows:

$$h_i = H(C_i)\ \forall\, i \in \{1, \ldots , N\} \tag{1}$$

wherein the hash values $h_i$ serve as a compact representation of each file chunk's content, facilitating efficient similarity checks while preserving the privacy and security of the file content.

To encode sequential information in the original files, at least one embodiment proposes a unique tree structure referred to herein as a SAKD tree, a data structure that extends KD trees with sequential awareness to capture both the spatial relationships of file chunks and their original sequence within the given file.

To construct a SAKD tree for a file F with hashed chunks $\{h_1, h_2, \ldots, h_N\}$, at least one embodiment includes considering each hash value $h_i$ as a point in a high-dimensional space, wherein the dimensionality corresponds to the hash size. The sequential position of each chunk, denoted as post, is integrated into the tree as an item of auxiliary information.

In one or more embodiments, SAKD tree construction can follow a recursive partitioning process, wherein at each node, the dataset is split based at least in part on the median value of the selected dimension. Unlike conventional KD trees, a SAKD tree incorporates pos; to maintain sequential information of each file chunk, and the integration of sequential information pos; into SAKD trees enables maintenance of file chunk order, enriching the tree with spatial and temporal (e.g., sequential) awareness.

Additional details regarding SAKD tree construction can be found in U.S. patent application Ser. No. 18/919,996, entitled "Digital File Similarity Detection Using Artificial Intelligence Techniques" and filed on Oct. 18, 2024, which is hereby incorporated by reference herein in its entirety.

Figure 3:
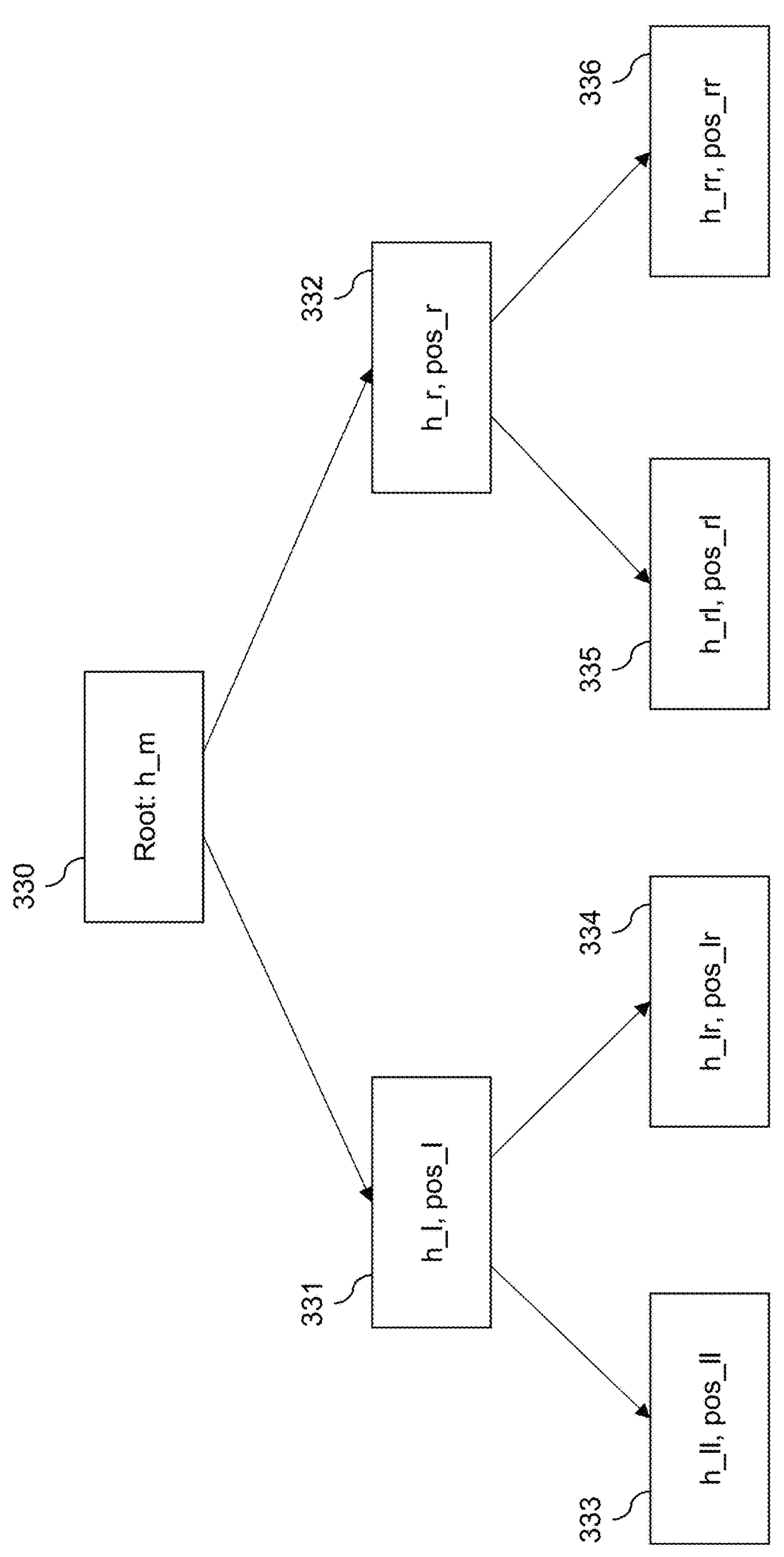
FIG. 3 shows an example structure of a sequential-aware k-dimensional (SAKD) tree in an illustrative embodiment.

FIG. 3 shows an example structure of a SAKD tree in an illustrative embodiment. By way of illustration, FIG. 3 depicts a root element 330 representing a hashed middle chunk (h_m) of a given digital file. From root element 330, the SAKD tree branches to element 331 representing a hashed chunk of the given digital file from a position left of root element 330 (h_l, pos_l). From root element 330, the SAKD tree also branches to element 332 representing a hashed chunk of the given digital file from a position right of root element 330 (h_r, pos_r).

From element 331, the SAKD tree further branches to element 333 representing a hashed chunk from a position left of element 331 (h_ll, pos_ll), as well as to element 334 representing a hashed chunk from a position right of element 331 (h_lr, pos_lr). Additionally, as depicted in FIG. 3, from element 332, the SAKD tree further branches to element 335 representing a hashed chunk from a position left of element 332 (h_rl, pos_rl), as well as to element 336 representing a hashed chunk from a position right of element 332 (h_rr, pos_rr).

Additionally, after constructing SAKD trees, at least one embodiment can include transforming these trees into graph representations and engineering features for nodes and edges to facilitate deep learning-based processing. In such an embodiment, each SAKD tree can be transformed into a graph G=(V,E), wherein V represents the set of vertices (or nodes) and E represents the set of edges. Each node $v_i \in V$ corresponds to a file chunk, characterized by its hash $h_i$ and position post. Also, in such an embodiment, edges $(v_i, v_j) \in E$ can be defined based at least in part on the spatial proximity and sequential relationship of the chunks, capturing both the structural and temporal relationships within the file.

Also, for each node $v_i$, at least one embodiment can include engineering a feature vector $f_i$ that encapsulates both the hash information and the positional information of the corresponding file chunk, such as illustrated in Equation (2) as follows:

$$f_i = [\text{Embed}(h_i); \text{Encode}(pos_i)] \tag{2}$$

wherein Embed($h_i$) represents an embedding of the hash value $h_i$, converting hash value $h_i$ into a dense vector. Also, Encode (post) represents an encoding of the position post, which may involve a positional encoding technique similar to those used in one or more transformers to maintain sequential information.

In one or more embodiments, edges are also enriched with one or more features to represent the type and strength of connections between nodes. Such an embodiment can include, for example, incorporating distance metrics and/or similarity measures based at least in part on the hashes and positions of the connected chunks.

With the graph representation of files, one or more embodiments include leveraging a spatial-sequential GNN to encode spatial and sequential information embedded within the graph. In such an embodiment, a GNN architecture is designed and/or implemented to process the nodes and edges of the graph, iteratively updating one or more node features based on local neighborhood information. The update rule for a node $v_i$ at layer l+1 is given in Equation (3) as follows:

$$h_i^{(l+1)} = \text{UPDATE}^{(l)}\left(h_i^{(l)}, \text{AGGREGATE}^{(l)}\left(\left\{h_j^{(l)} : j \in \mathcal{N}(i)\right\}\right)\right) \tag{3}$$

wherein $$h_i^{(l)}$$

is the feature vector of node $v_i$ at layer l, $\mathcal{N}$ (i) denotes the set of neighbors of $v_i$, AGGREGATE$^{(l)}$ is an aggregation function (such as, e.g., mean, sum, max, etc.) that combines features from $v_i$'s neighbors, and UPDATE$^{(l)}$ is an update function (e.g., a neural network layer) that updates $v_i$'s feature based at least in part on its own features and one or more aggregated neighbor features.

Additionally or alternatively, at least one embodiment can include implementing an enhanced GNN model architecture which explicitly incorporates sequential information within its update and aggregate functions, to facilitate handling spatial relationships and sequential dynamics within file graphs. For example, to incorporate sequential information, the update and aggregate functions can be modified to leverage the sequential position parameter post of each node, allowing the model to consider the original order of file chunks during processing. This can be achieved by introducing a positional encoding to each node's feature, similar to the techniques used in one or more transformers, and by designing the aggregate function to weigh contributions from neighbors based at least in part on their sequential positions.

For an aggregate function with sequential awareness, the modified aggregate function, $$\text{AGGREGATE}_{seq}^{(l)},$$

incorporates the sequential distance between nodes as a factor in the aggregation process, such as illustrated in Equation (4) as follows:

$$\text{AGGREGATE}_{seq}^{(l)} = \sum\nolimits_{j \in \mathcal{N}(i)} w_{ij} \cdot h_j^{(l)} \tag{4}$$

wherein $w_{ij}$ is a weight that decreases with increasing sequential distance between nodes i and j, emphasizing closer sequential neighbors more heavily in the aggregation.

In at least one embodiment, the update function integrates one or more spatial-temporal attention mechanisms, enabling the model to dynamically adjust the influence of spatial and sequential information based on the context, as illustrated in Equation (5) as follows:

$$h_i^{(l+1)} = \text{UPDATE}_{STAR}^{(l)}\left(h_i^{(l)}, \text{AGGREGATE}_{seq}^{(l)}\right) \tag{5}$$

wherein the $$\text{UPDATE}_{STAR}^{(l)}$$

function uses a combination of self-attention for spatial processing and cross-attention mechanisms for capturing temporal dynamics, effectively learning from both the current state of a node and its evolution over time. Accordingly, this function, termed $$\text{UPDATE}_{STAR}^{(l)},$$

leverages spatial-temporal attention mechanisms to adaptively process interactions between nodes, considering their content, spatial relationships and sequential order.

More particularly, the $$\text{UPDATE}_{STAR}^{(l)}$$

function utilizes a combination of self-attention and More particularly, the cross-attention mechanisms, drawing inspiration from at least one transformer architecture, to process nodes in a graph. The self-attention component focuses on capturing one or more spatial relationships between nodes (also referred to herein as file chunks). For each node i, a self-attention mechanism computes attention scores with all other nodes j in its neighborhood $\mathcal{N}$ (i), based on their feature vectors $$h_i^{(l)}$$

and $$h_j^{(l)}.$$

This allows the model to dynamically prioritize one or more nodes based at least in part on their spatial relevance to i, enhancing the model's ability to understand spatial structures within the file.

In one or more embodiments, the attention score between nodes i and j can be computed using Equation (6) as follows:

$$\alpha_{ij} = \frac{\exp\left(LeakyReLU\left(a^T\left[W h_i^{(l)} \| W h_j^{(l)}\right]\right)\right)}{\sum_{k \in N(i)} \exp\left(LeakyReLU\left(a^T\left[W h_i^{(l)} \| W h_k^{(l)}\right]\right)\right)} \quad (6)$$

wherein $a^T$ is a learnable weight vector, W is a learnable weight matrix applied to the node features, and || denotes concatenation. The LeakyReLU nonlinearity introduces a gradient when the unit is not active, helping prevent a dying rectified linear unit (ReLU) problem.

In one or more embodiments, the cross-attention component can be designed to capture sequential dynamics by allowing each node to attend to other nodes based at least in part on their sequential positions. This can be particularly important for understanding how the role and/or importance of an item of information may evolve over the sequence of file chunks. In at least one embodiment, in the cross-attention step, for each node i, attention scores are computed based at least in part on the current feature representations and incorporation of the encoded sequential positions $pos_i$ and $pos_j$, enhancing the model's ability to capture temporal sequences and dependencies between file chunks.

Additionally, one or more embodiments include implementing a feature update with spatial-temporal context. In such an embodiment, after computing the attention scores, the $$\text{UPDATE}_{STAR}^{(l)}$$

function updates the feature vector of each node by aggregating the features of its neighbors, weighted by the computed attention scores, and then combines this aggregated information with the node's own features to produce a new feature vector $$h_i^{(l+1)},$$

such as detailed in Equation (7) as follows:

$$h_i^{(l+1)} = \text{COMBINE}\left(h_i^{(l)}, \sum_{j \in N(i)} \alpha_{ij} \cdot W h_j^{(l)}\right) \quad (7)$$

wherein the COMBINE operation can include, e.g., a concatenation followed by a linear layer, mechanisms such as gating or residual connections, etc., to integrate spatial and temporal information.

To aggregate enhanced node features into a single feature vector, one or more embodiments can include employing advanced graph pooling techniques such as, e.g., global attention pooling and hierarchical pooling. Global attention pooling includes at least one learnable global attention mechanism that weighs nodes based at least in part on their importance to the overall file representation, focusing on chunks that define the file's uniqueness. Also, hierarchical pooling includes implementing at least one approach that progressively aggregates node features at multiple levels, preserving structural and sequential information in the pooled representation.

In at least one embodiment, the pooled graph representation is then transformed into a feature vector for each file, capturing the file's spatial-sequential essence. This vector serves as a comprehensive representation of the file, ready for similarity comparisons and/or analysis.

In one or more embodiments, such similarity comparisons and/or analysis can include performing fuzzy similarity matching. In such an embodiment, comparing the feature vectors of files can include utilizing metrics that consider both the magnitude and orientation of vectors, such as, e.g., cosine similarity, which measures the cosine of the angle between two vectors, useful for determining the similarity in orientation, independent of magnitude, and Euclidean distance, which computes the straight-line distance between two vectors, useful for understanding the absolute difference in their features.

Additionally, in one or more embodiments, a comparison and/or matching process can involve comparing the feature vector of a query file against one or more vectors in at least one database, identifying one or more files with the highest similarity scores to the query file as potential matches. Such an approach enables the detection of files that are not only similar in content but also in their structural and/or sequential makeup, offering a more granular view of file similarity.

Figure 4:
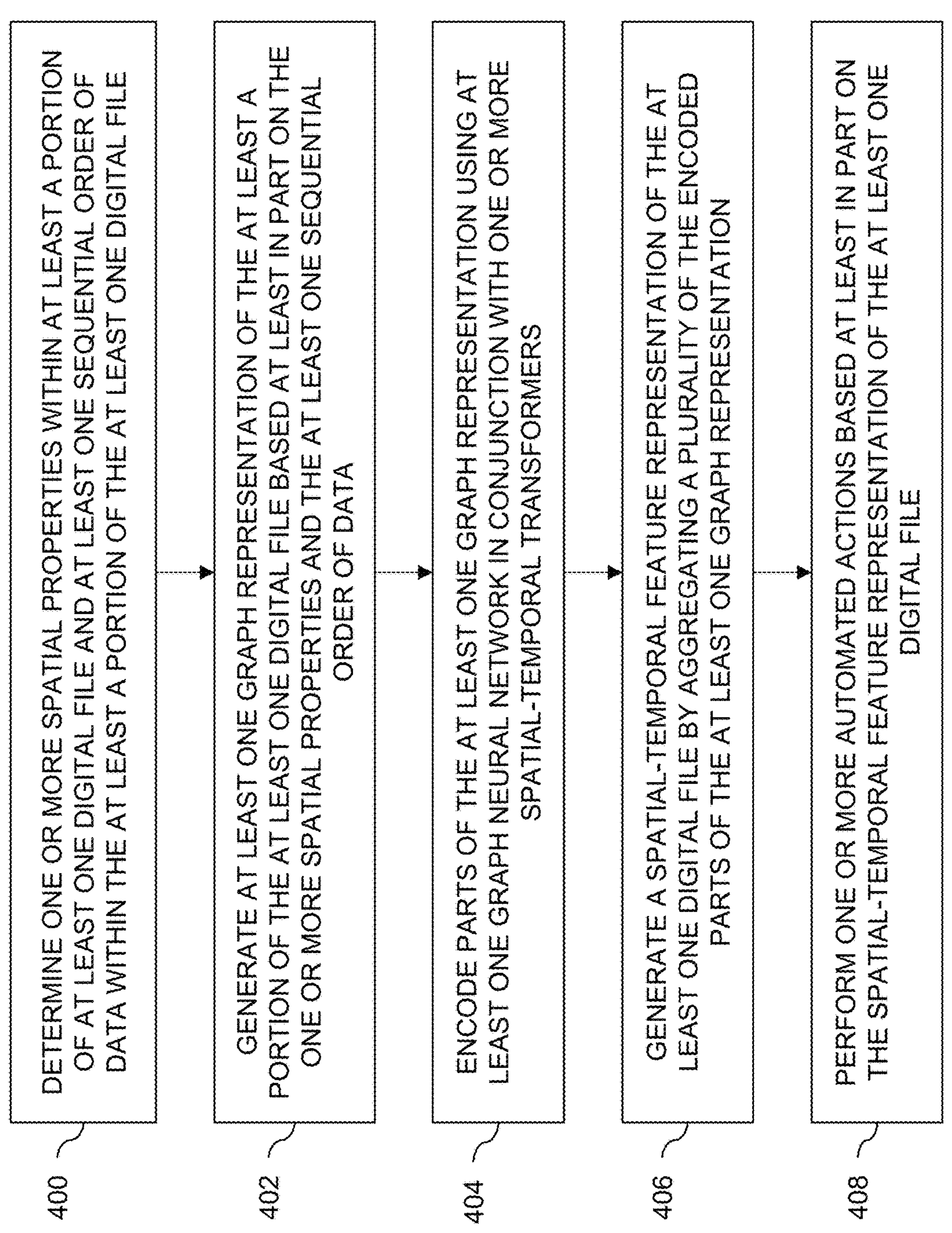
FIG. 4 is a flow diagram of a process for generating spatial-temporal representations of digital files using artificial intelligence techniques in an illustrative embodiment.

FIG. 4 is a flow diagram of a process for generating spatial-temporal representations of digital files using artificial intelligence techniques in an illustrative embodiment. It is to be understood that this particular process is only an example, and additional or alternative processes can be carried out in other embodiments.

In this embodiment, the process includes steps 400 through 408. These steps are assumed to be performed by the digital file representation generation system 105 utilizing elements 112, 114, 116, 118 and 120.

Step 400 includes determining one or more spatial properties within at least a portion of at least one digital file and at least one sequential order of data within the at least a portion of the at least one digital file. In at least one embodiment, determining one or more spatial properties within at least a portion of at least one digital file and at least one sequential order of data within the at least a portion of the at least one digital file includes generating one or more sequential-aware k-dimensional trees representing the at least a portion of the at least one digital file. In such an embodiment, generating one or more sequential-aware k-dimensional trees can include encoding spatial information of the at least a portion of the at least one digital file using at least one dynamic position technique, and incorporating context information into the at least a portion of the at least one digital file using at least one file variational autoencoder.

Step 402 includes generating at least one graph representation of the at least a portion of the at least one digital file based at least in part on the one or more spatial properties and the at least one sequential order of data. Step 404 includes encoding parts of the at least one graph representation using at least one graph neural network in conjunction with one or more spatial-temporal transformers. In at least one embodiment, encoding parts of the at least one graph representation includes iteratively updating one or more node features associated with one or more nodes within the at least one graph representation based at least in part on local neighborhood information determined by processing, using the at least one graph neural network in conjunction with the one or more spatial-temporal transformers, the one or more nodes and one or more edges within the at least one graph representation.

Additionally or alternatively, encoding parts of the at least one graph representation can include leveraging sequential order information attributed to each of multiple nodes within the at least one graph representation by implementing a positional encoding to at least one feature associated with each of the multiple nodes using the one or more spatial-temporal transformers.

Step 406 includes generating a spatial-temporal feature representation of the at least one digital file by aggregating a plurality of the encoded parts of the at least one graph representation. In one or more embodiments, aggregating a plurality of the encoded parts of the at least one graph representation includes weighting, for each of the multiple nodes, contributions from one or more neighboring nodes based at least in part on the sequential order information attributed to each of multiple nodes. Additionally or alternatively, aggregating a plurality of the encoded parts of the at least one graph representation can include aggregating, using at least one graph pooling operation, one or more features of at least a portion of multiple nodes of the at least one graph representation. In such an embodiment, generating a spatial-temporal feature representation of the at least one digital file can include generating at least one feature vector of the at least one digital file using at least a portion of the one or more aggregated features.

Step 408 includes performing one or more automated actions based at least in part on the spatial-temporal feature representation of the at least one digital file. In at least one embodiment, performing one or more automated actions includes automatically updating the spatial-temporal feature representation of the at least one digital file by repeating, for at least one additional portion of the at least one digital file, the determining step, the generating at least one graph representation step, and the encoding step. Such an embodiment also includes updating the spatial-temporal feature representation of the at least one digital file based at least in part on one or more outputs of the repeated encoding step. Additionally or alternatively, performing one or more automated actions can include automatically training one or more of at least a portion of the at least one graph neural network and at least a portion of the one or more spatial-temporal transformers based at least in part on feedback related to the spatial-temporal feature representation of the at least one digital file. Further, in one or more embodiments, performing one or more automated actions includes automatically outputting the spatial-temporal feature representation of the at least one digital file to one or more of at least one device and at least one system associated with processing digital files.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate spatial-temporal feature representations of digital files using spatial-sequential graph encoding techniques. These and other embodiments can effectively overcome problems associated with scaling and latencies arising from inadequate and/or imprecise outcomes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
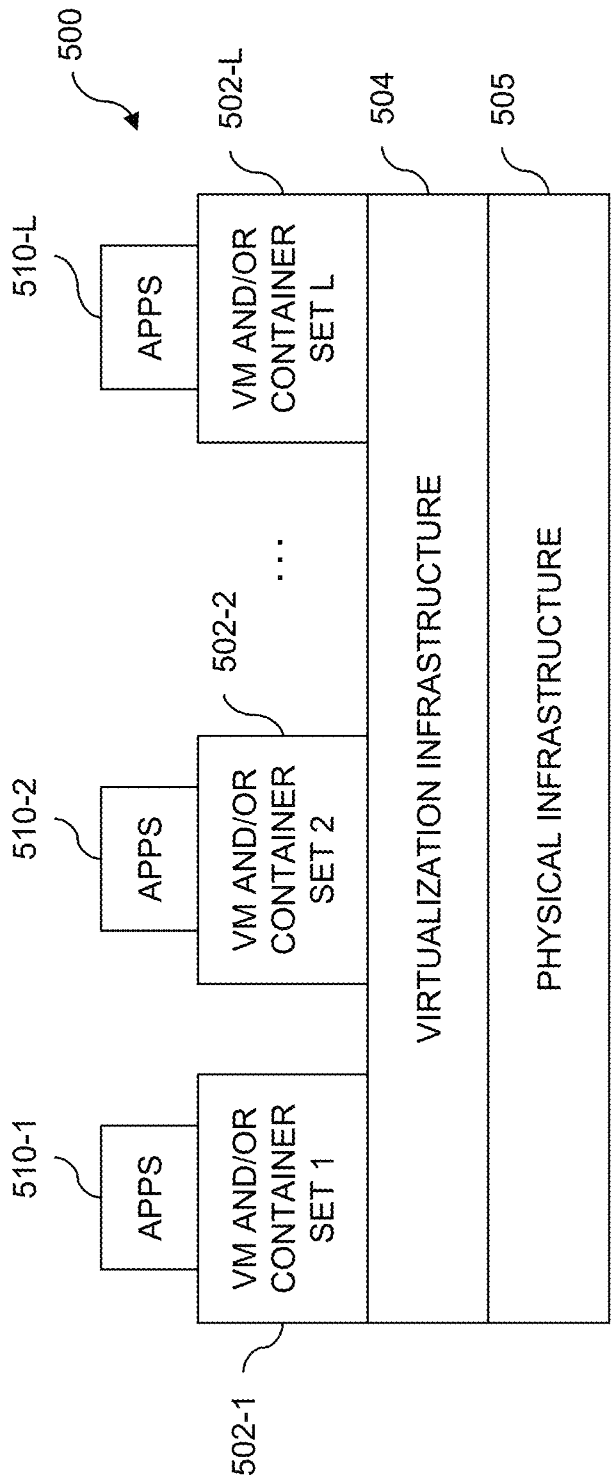
FIGS. 5 and 6 show examples of processing platforms that may be utilized to implement at least a portion of an information processing system in illustrative embodiments.
Figure 6:
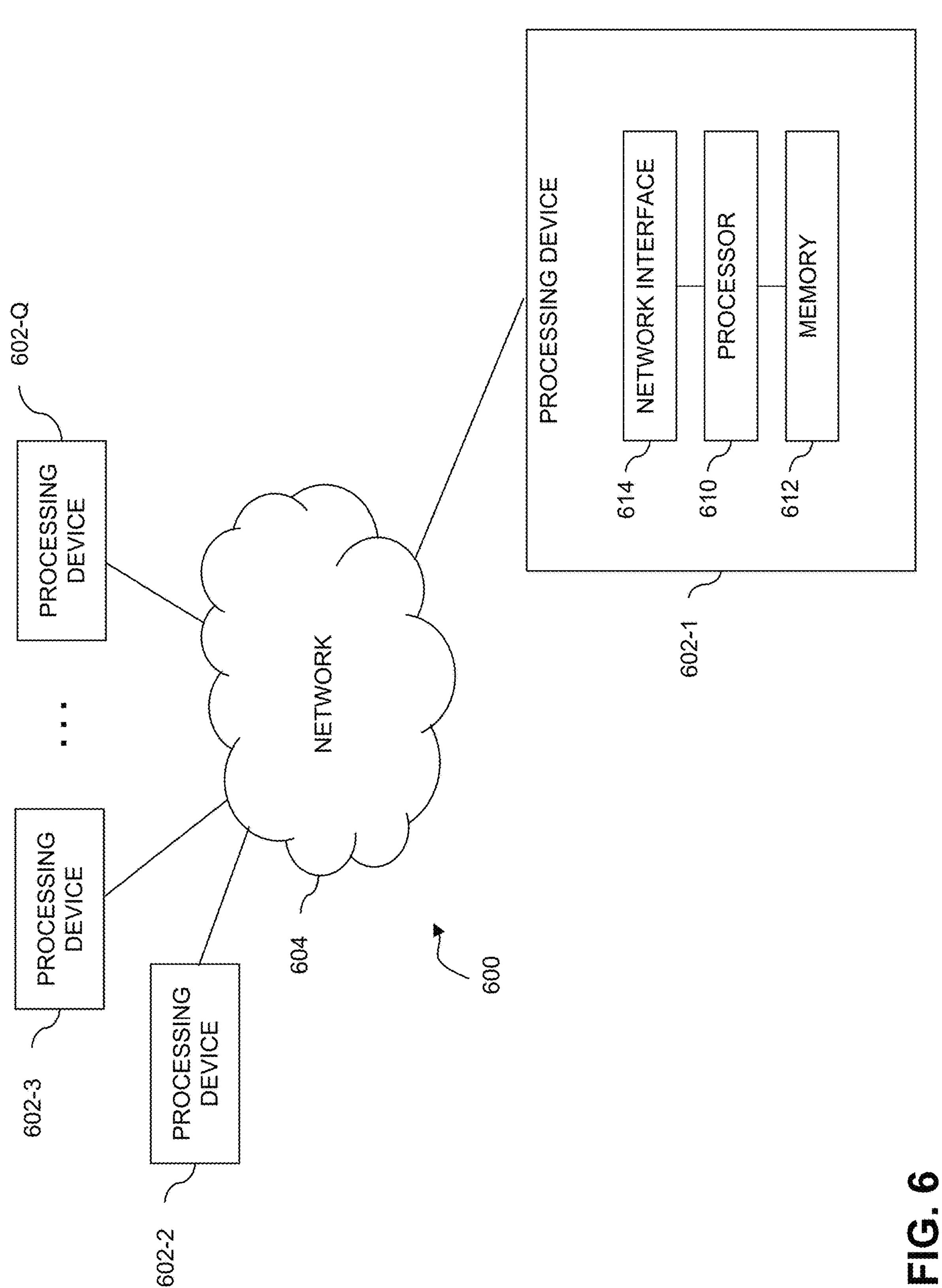

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more information processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-Q, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, an ASIC, an SOC, an FPGA, a CPU, a GPU, an NPU, a DPU, a TPU, an ALU, a DSP, and/or other similar processing device components, as well as other types and arrangements of processing circuitry, in any combination. At least a portion of the functionality of at least one artificial intelligence system and its associated artificial intelligence algorithms provided by one or more processing devices as disclosed herein can be implemented using such circuitry.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment. It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

determining (i) one or more spatial properties within at least a portion of at least one digital file and (ii) at least one sequential order of data within the at least a portion of the at least one digital file;

generating at least one graph representation of the at least a portion of the at least one digital file based at least in part on the one or more spatial properties and the at least one sequential order of data;

encoding parts of the at least one graph representation using at least one graph neural network in conjunction with one or more spatial-temporal transformers;

generating a spatial-temporal feature representation of the at least one digital file by aggregating a plurality of the encoded parts of the at least one graph representation; and performing one or more automated actions based at least in part on the spatial-temporal feature representation of the at least one digital file, wherein performing one or more automated actions comprises automatically initiating at least one digital file similarity detection operation based at least in part on at least a portion of the spatial-temporal feature representation of the at least one digital file;

wherein the method is performed by at least one processing device comprising a processor coupled to a memory.

2. The computer-implemented method of claim 1, wherein encoding parts of the at least one graph representation comprises iteratively updating one or more node features associated with one or more nodes within the at least one graph representation based at least in part on local neighborhood information determined by processing, using the at least one graph neural network in conjunction with the one or more spatial-temporal transformers, the one or more nodes and one or more edges within the at least one graph representation.

3. The computer-implemented method of claim 1, wherein encoding parts of the at least one graph representation comprises leveraging sequential order information attributed to each of multiple nodes within the at least one graph representation by implementing a positional encoding to at least one feature associated with each of the multiple nodes using the one or more spatial-temporal transformers.

4. The computer-implemented method of claim 3, wherein aggregating a plurality of the encoded parts of the at least one graph representation comprises weighting, for each of the multiple nodes, contributions from one or more neighboring nodes based at least in part on the sequential order information attributed to each of multiple nodes.

5. The computer-implemented method of claim 1, wherein determining (i) one or more spatial properties within at least a portion of at least one digital file and (ii) at least one sequential order of data within the at least a portion of the at least one digital file comprises generating one or more sequential-aware k-dimensional trees representing the at least a portion of the at least one digital file.

6. The computer-implemented method of claim 5, wherein generating one or more sequential-aware k-dimensional trees comprises encoding spatial information of the at least a portion of the at least one digital file using at least one dynamic position technique, and incorporating context information into the at least a portion of the at least one digital file using at least one file variational autoencoder.

7. The computer-implemented method of claim 1, wherein aggregating a plurality of the encoded parts of the at least one graph representation comprises aggregating, using at least one graph pooling operation, one or more features of at least a portion of multiple nodes of the at least one graph representation.

8. The computer-implemented method of claim 7, wherein generating a spatial-temporal feature representation of the at least one digital file comprises generating at least one feature vector of the at least one digital file using at least a portion of the one or more aggregated features.

9. The computer-implemented method of claim 1, wherein performing one or more automated actions comprises:

automatically updating the spatial-temporal feature representation of the at least one digital file by repeating, for at least one additional portion of the at least one digital file, the determining step, the generating at least one graph representation step, and the encoding step; and updating the spatial-temporal feature representation of the at least one digital file based at least in part on one or more outputs of the repeated encoding step.

10. The computer-implemented method of claim 1, wherein performing one or more automated actions comprises automatically training one or more of at least a portion of the at least one graph neural network and at least a portion of the one or more spatial-temporal transformers based at least in part on feedback related to the spatial-temporal feature representation of the at least one digital file.

11. The computer-implemented method of claim 1, wherein performing one or more automated actions comprises automatically outputting the spatial-temporal feature representation of the at least one digital file to one or more of at least one device and at least one system associated with processing digital files.

12. A non-transitory processor-readable storage medium having stored therein program code of one or more software programs, wherein the program code when executed by at least one processing device causes the at least one processing device:

to determine (i) one or more spatial properties within at least a portion of at least one digital file and (ii) at least one sequential order of data within the at least a portion of the at least one digital file;

to generate at least one graph representation of the at least a portion of the at least one digital file based at least in part on the one or more spatial properties and the at least one sequential order of data;

to encode parts of the at least one graph representation using at least one graph neural network in conjunction with one or more spatial-temporal transformers;

to generate a spatial-temporal feature representation of the at least one digital file by aggregating a plurality of the encoded parts of the at least one graph representation; and to perform one or more automated actions based at least in part on the spatial-temporal feature representation of the at least one digital file, wherein performing one or more automated actions comprises automatically initiating at least one digital file similarity detection operation based at least in part on at least a portion of the spatial-temporal feature representation of the at least one digital file.

13. The non-transitory processor-readable storage medium of claim 12, wherein encoding parts of the at least one graph representation comprises iteratively updating one or more node features associated with one or more nodes within the at least one graph representation based at least in part on local neighborhood information determined by processing, using the at least one graph neural network in conjunction with the one or more spatial-temporal transformers, the one or more nodes and one or more edges within the at least one graph representation.

14. The non-transitory processor-readable storage medium of claim 12, wherein encoding parts of the at least one graph representation comprises leveraging sequential order information attributed to each of multiple nodes within the at least one graph representation by implementing a positional encoding to at least one feature associated with each of the multiple nodes using the one or more spatial-temporal transformers.

15. The non-transitory processor-readable storage medium of claim 14, wherein aggregating a plurality of the encoded parts of the at least one graph representation comprises weighting, for each of the multiple nodes, contributions from one or more neighboring nodes based at least in part on the sequential order information attributed to each of multiple nodes.

16. The non-transitory processor-readable storage medium of claim 12, wherein aggregating a plurality of the encoded parts of the at least one graph representation comprises aggregating, using at least one graph pooling operation, one or more features of at least a portion of multiple nodes of the at least one graph representation.

17. An apparatus comprising:

at least one processing device comprising a processor coupled to a memory;

the at least one processing device being configured:

to determine (i) one or more spatial properties within at least a portion of at least one digital file and (ii) at least one sequential order of data within the at least a portion of the at least one digital file;

to generate at least one graph representation of the at least a portion of the at least one digital file based at least in part on the one or more spatial properties and the at least one sequential order of data;

to encode parts of the at least one graph representation using at least one graph neural network in conjunction with one or more spatial-temporal transformers;

to generate a spatial-temporal feature representation of the at least one digital file by aggregating a plurality of the encoded parts of the at least one graph representation; and to perform one or more automated actions based at least in part on the spatial-temporal feature representation of the at least one digital file, wherein performing one or more automated actions comprises automatically initiating at least one digital file similarity detection operation based at least in part on at least a portion of the spatial-temporal feature representation of the at least one digital file.

18. The apparatus of claim 17, wherein encoding parts of the at least one graph representation comprises iteratively updating one or more node features associated with one or more nodes within the at least one graph representation based at least in part on local neighborhood information determined by processing, using the at least one graph neural network in conjunction with the one or more spatial-temporal transformers, the one or more nodes and one or more edges within the at least one graph representation.

19. The apparatus of claim 17, wherein encoding parts of the at least one graph representation comprises leveraging sequential order information attributed to each of multiple nodes within the at least one graph representation by implementing a positional encoding to at least one feature associated with each of the multiple nodes using the one or more spatial-temporal transformers.

20. The apparatus of claim 17, wherein aggregating a plurality of the encoded parts of the at least one graph representation comprises aggregating, using at least one graph pooling operation, one or more features of at least a portion of multiple nodes of the at least one graph representation.

* * * * *